3,248,276
POLYMERIZATES OF HYDROXYETHERIFIED PHENOLIC RESIN ESTERIFIED WITH UNSATURATED POLYCARBOXYLIC ACID AND LAMINATES THEREFROM
Claude Thomas Bean, Jr., Niagara Falls, and Donald H. Thorpe, Williamsville, N.Y., assignors to Hooker Chemical Corporation, Niagara Falls, N.Y., a corporation of New York
No Drawing. Filed Oct. 9, 1961, Ser. No. 143,541
21 Claims. (Cl. 161—195)

This invention broadly relates to new polymers and a novel process for their preparation. In some of its more specific aspects, the invention further relates to the preparation of improved castings, laminates, and reinforced plastic articles comprising the polymers of the invention and to the products thus prepared.

The use of monofunctional materials in polymers generally has not received acceptance in the art since such materials terminate the polymer chains. However, it has been discovered that there is a variety of monofunctional materials which when combined with certain other materials result in an improved polymer. In accordance with one important aspect of the present invention, suitable polyfunctional materials may be used with monofunctional material and a second polyfunctional material to produce desirable plastic products that are characterized by, among other things, low cost, flame resistance, low density, good electrical properties, high strength, convenient handling characteristics and freedom from undue discoloration.

Phenolic condensation products which are fusible and soluble, such as novolaks or resoles, are useful in the process of the present invention as the polyfunctional material which may be reacted with the mono and second polyfunctional material. As a typical example, a novolak resin which is a condensation product of a phenol and formaldehyde may be reacted with a mixture of mono and polyfunctional materials of such a nature that the hydroxyl groups of the novolak are blocked from further reaction by esterification and/or etherification and then the resinous resultant product may be polymerized through remaining functional groups of the esterifying and/or etherifying materials. By the esterification or etherification of the free reactive phenolic hydroxyl groups of the novolak, the remaining ortho or para positions of the phenolic residues are rendered inactive to normal condensation polymerization with substances such as aldehydes or ketones.

Phenolic resins have been used in laminating and molding operations of the prior art where high temperatures and pressures are necessary in order to obtain suitable products because in condensation polymerization, water or ammonia is eliminated. The resultant products had only fair flame resistance, and phenolic resins also are generally dark colored and darken to even deeper hues on exposure to light, exhibit poor alkali resistance, and have other serious disadvantages. The art has long sought polymers which combine the desirable properties of the phenolic resins with other desirable properties such as light colors and an ability to be cured to high-strength products by addition polymerization without elimination of water, ammonia or other by-product, at low or contact pressure, and which may be produced at low cost. However, prior to the present invention, entirely satisfactory polymers having the above characteristics were not available.

It is an object of the present invention to provide a novel process for the preparation of improved polymers based on fusible, solvent soluble condensates of a phenol and an aldehyde, and to provide the polymers thus prepared.

It is still a further object of the present invention to provide a novel process for preparing improved curable thermoplastic polymers from phenol-aldehyde condensates, a process for preparing thermoset polymers therefrom, and to provide the thermoset polymers thus prepared.

It is still a further object of the present invention to prepare improved polyester resins from phenol-aldehyde condensates, and to provide the polymers thus prepared.

It is still a further object of the present invention to provide a novel polymerizable composition of matter comprising an ethylenically unsaturated polymer of the invention and an ethylenically unsaturated monomer copolymerizable therewith.

It is still a further object of the present invention to provide improved castings, laminates, reinforced plastic articles.

Still other objects and advantages of the present invention will be apparent to those skilled in the art upon reference to the following detailed description and the examples.

In accordance with one important variant of the present invention, it has been discovered that fusible, solvent soluble condensation products of a phenol and an aldehyde containing condensate units having reactive phenolic hydroxyl groups may be reacted through the phenolic hydroxyl groups with a compound which in turn may be reacted with a compound which is ethylenically unsaturated, to thereby provide curable thermoplastic polymers which may be cured to produce improved thermoset polymers having the desirable properties mentioned herein. Soluble, fusible phenol-aldehyde condensates suitable for use as starting materials in practicing the present invention are well known to the art and may be prepared by well known methods. The phenol-aldehyde condensate should be soluble in organic solvents such as acetone and it should not be advanced to the insoluble "C" stage or resite stage. When the phenol is phenol itself and the aldehyde is formaldehyde, one type of condensate which is highly satisfactory contains condensation units which may be exemplified by the following formula:

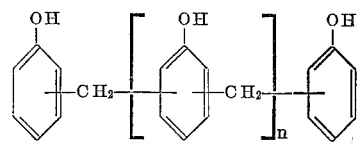

where $n$ represents a numeral varying from 1 to 10, and often higher provided the resin is fusible and acetone or organic solvent-soluble. Preferably, the phenol-aldehyde condensate is a novolak, which contains more than one mole of phenol per mole of aldehyde.

Examples of phenols which may be used in preparing phenol-aldehyde condensates for use in practicing the invention include phenol itself or substituted phenols having the following general formula:

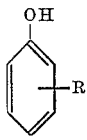

where R may be H, F, Cl, Br or a suitable substituent selected from the following:
(a) Alkyl groups of 1 to 18 carbon atoms in any of their isomeric forms and substituted on the phenolic nucleus in the ortho, meta or para positions;

(b) Alicyclic groups of 5 to 18 carbon atoms such as cyclohexyl, cyclopentyl, methyl cyclohexyl, butyl-cyclohexyl, etc.;

(c) Aromattic or aralkyl groups of 6 to 18 carbon atoms such as phenyl, alpha-methyl benzyl, benzyl, cumyl, etc.;

(d) Alkyl, alicyclic, aryl and aralkyl ketones wherein the hydrocarbon is defined hereinbefore.

(e) Alkyl, alicyclic, aryl and aralkyl carboxylic groups wherein the hydrocarbon is defined hereinbefore.

Suitable substituted phenols include the following:

Para-tertiary-butylphenol,
Para-secondary-butylphenol,
Para-tertiary hexylphenol,
Para-isooctyl-phenol,
Para-phenylphenol,
Para-benzylphenol,
Para-cyclohexylphenol,
Para-decyl-phenol,
Para-dodecyl-phenol,
Para-tetra-decyl-phenol,
Para-octa-decyl-phenol,
Para-nonyl-phenol,
Para-methyl-phenol,
Para-beta-naphthyl-phenol,
Para-alpha-naphthyl-phenol,
Para-pentadecyl-phenol,
Para-cetyl-phenol,
Para-cumyl phenol,
Para-hydroxy acetophenone,
Para-hydroxy benzophenone, a phenol alkylated with limonene, a phenol alkylated with oleic acid, as well as the corresponding ortho and meta derivatives such as meta-butyl phenol and ortho-butyl phenol, as well as mixtures thereof.

From the foregoing, it is apparent that substantially any phenol may be used in practicing the present invention provided it has a reactive phenolic hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some polyalkylated as well as unalkylated phenols. Mixtures of phenols mentioned herein also may be used.

In producing the parent phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxane. Other examples of aldehydes include acetaldehyde, propionaldehyde, butyraldehyde, benzaldehyde, furfural, 2-ethylhexanal, ethylbutyraldehyde, heptaldehyde, glyoxal, etc.

The amount of aldehyde to be condensed with the phenol may be varied to prepare novolaks of varying molecular weights and the viscosity of the finished resin may be controlled by the mol weight of the novolak. Preferably, the amount of aldehyde varies from 0.5 to 1.0 mol per mol of the phenol when a mono or difunctional phenol is used. In instances where a trifunctional phenol is used, the preferred upper limit of aldehyde may be about 0.85 mol per mol of phenol so as to prevent formation of insoluble and infusible condensates.

In instances where a novolak is prepared using the above-described ratios of aldehyde to phenol, it is preferred that the aldehyde and phenol be reacted using an acid catalyst such as sulfuric, hydrochloric or oxalic acid, but basic catalysts also may be used. In some instances, catalysts may not be necesary. Examples of alkaline catalysts include ammonia, amines and quaternary ammonium bases. Wetting agents of the anionic type such as sodium alkyl aryl sulfonate, may speed up the reaction when weak acids are used and also may be present.

In instances where a resole is prepared, more than one mol of formaldehyde per mol of phenol may be useful. The specific phenols and aldehydes which can be used are described above, and the alkaline catalysts described above also are useful. The resoles have carbinol groups as well as phenolic hydroxyl groups which can be reacted with the reagents to be discussed hereinafter.

In accordance with the present invention, improved polymers can be prepared which preferably contain substantially no free reactive phenolic groups (less than about 0.5 percent of the phenolic hydroxyl, for example) present originally in the phenol-aldehyde condensate. The phenol-aldehyde resin can be reacted with a suitable substance designed to etherify or esterify the phenolic hydroxyl groups provided that at least one of the phenolic hydroxyl groups present in each phenol-aldehyde condensate unit is reacted with a substance or substances which are in turn reacted with an ethylenically unsaturated compound.

It is preferred to first hydroxyalkylate the phenolic hydroxyl groups, and then to esterify the resultant groups with a carboxylic acid, acid chloride or acid anhydride. The preferred method of hydroxyalkylation is by reaction with compounds containing a mono oxirane ring. Such compounds include ethylene, propylene, butylene, styrene and cyclohexene oxides, glycide and epichlorohydrin. Many other monoepoxides can be used, but the alkylene oxides containing not more than six carbons are generally used. Additional useful compounds are phenyl glycidyl ether and related compounds prepared from the reaction of epichlorohydrin and monofunctional alkylated and halogenated phenols such as pentachlorophenyl glycidyl ether.

Catalysts for the reaction of the oxtrane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. The reaction may be carried out at temperatures of fifty to two hundred and fifty degrees centigrade, and preferably in the absence of solvents, although solvents may be used for the higher molecular weight resins to reduce viscosity.

The phenolic hydroxyl of the novolaks may also be hydroxyalkylated by reacting alkylene halohydrins with the phenolic hydroxyl using equivalent amounts of an alkali metal hydroxide to bring about the reaction. Suitable alkylene halohydrins are ethylene chloro or bromohydrins, propylene chloro or bromohydrins, 2,3-butylene chloro or bromo-hydrins, glyceryl chloro or bomo-hydrins.

Another method for hydroxyalkylating novolaks is reaction with alkylene carbonates such as ethylene carbonate and propylene carbonate, using a catalyst such as potassium carbonate.

It is preferred that the novolaks or resoles be reacted until substantially all of the reactive phenolic hydroxyl groups have reacted (leaving preferably less than 0.5 percent of the phenolic hydroxyls unreacted). This is desirable to prevent inhibition of the reaction of the unsaturated esters with ethylenically unsaturated monomers and to give oxidation and light stability in the resultant product. At least one mol of alkylene oxide or other etherifying or esterifying agent is required per mol of phenolic hydroxyl. However, resins prepared by reaction with up to three mols of alkylene oxide per mol of phenolic hydroxyl are useful. It is required that there be at least one hydroxyalkyl group per condensate molecule.

A variety of acids, acid halides, acid anhydrides, etc., or mixtures thereof may be used for reaction with the hydroxyalkyl phenylethers of novolaks or resoles such as prepared in accordance with the invention. For example, the hydroxy-alkyl novolaks may be esterified with 0.5 to 1.0 mol of an alpha,beta-unsaturated dicarboxylic acid anhydride per hydroxyl equivalent. The carboxylic acids and the corresponding acid chlorides and acid anhydrides may include maleic, chloromaleic, ethylmaleic, itaconic, citraconic, xeronic, and pyrocinchoninic, either alone or as a mixture. The resins may be modified for special properties by using some polycarboxylic anhydrides which are not alpha,beta-unsaturated along with the above-mentioned anhydrides. For example, 1,4,5,6,7,7-hexachlorobicyclo-(2.2.1)-5-heptene-2,3-dicarboxylic anhydride and tetrachlorophthalic impart flame resistance. Examples of other useful acids, acid chloride and anhydrides include phthalic, tetrahydrophthalic, cyclopentadiene and methyl cyclopentadiene-maleic adducts, succinic, tricarballylic, glutonic, dodecyl succinic, etc. The hydroxyalkyl novolaks may also be modified with monobasic acids, acid chlorides or anhydrides, and especially such as chlorinated benzoics, chloroacetics, fatty acids, etc., monobasic unsaturated acids such as acrylic, methacrylic, crotonic, chloroacrylic, or cinnamic acid which increase the ethylenic unsaturation.

The esterification of the hydroxyether derivative is preferably carried out at a temperature in the range of about one hundred to one hundred and fifty degrees centigrade, although higher and lower temperatures can be used. When polycarboxylic acids are used, the progress of the esterification reaction can be monitored by measuring the quantity of water of esterification that is produced. Small quantities of toluene or xylene can be used as azeotroping agents to facilitate removal of the water. When acid chlorides are used, it is preferred to use solvents during the reaction. The acid chloride can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reactions involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are tertiary amines such as pyridines, and triethylamine.

The resultant ethylenic polymer may be cured by crosslinking in the presence of a catalytic amount of a conventional polymerization catalyst for addition polymerization of ethylenically unsaturated materials, including free radical catalysts such as benzoyl peroxide and other organic peroxides. The polymer may also be cured by copolymerization with an ethylenically unsaturated monomeric material copolymerizable therewith, and preferably in the presence of a catalytic amount of a polymerization catalyst such as mentioned above.

The ethylenically unsaturated monomers which may be used in curing or cross-linking the ethylenically unsaturated polymers of the present invention may be varied widely. While other materials may be used, it is preferred that addition polymerization be practiced since no by-product ammonia, water, etc., is formed and the problems resulting therefrom are not experienced. The monomers useful in curing the thermoplastic unsaturated polymers include vinylic compounds or mixtures thereof capable of cross-linking ethylenically unsaturated polymer chains at their points of unsaturation and usually they contain the reactive group $H_2C$—$C$=. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adiphate, diallyl sebacate, diethylene glycol bis (allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

To prepare laminating resins, monomers which will copolymerize with the half esters of the dibasic unsaturated acids or ether linkages may be used. These include styrene, vinyltoluene, diallyl phthalate, triallyl phosphate and other alkyl esters, methylstyrenes, vinyl acetate, acrylate, and methacrylate esters, divinyl benzene, chlorostyrenes, etc.

When dibasic acids or their derivatives are used, the half esters of the hydroxyalkyl phenyl novolak ethers have free carboxyl groups. Through these polyfunctional half esters unique branched chain polyesters may be obtained by alternate reaction of the hydroxyalkylating agents described above and unsaturated acid anhydrides, or mixtures of unsaturated and saturated acids, acid chlorides and anhydrides. Hydroxy rich resins may be prepared by reaction of one mol of hydroxyalkylating agent per mol of carboxylic acid. Simple esters may be difficult to prepare by direct esterification because ester interchange may lead to crosslinking. Methyl esters may be prepared, if desired, by reaction of the resin with dimethoxypropane.

From the foregoing discussion it is apparent that the unsaturated polymers of our invention differ markedly from prior art polymers. It has been known to provide unsaturation in the polymer chain or "backbone" by reacting compounds such as ethylene glycol and maleic acid. But in this invention, the backbone of the polymer molecule is provided by a phenol aldehyde condensation product, which is not ethylenically unsaturated. The unsaturation is provided in the side-chains that are reacted onto the base polymer. The reactivity of such a polymer molecule is different than that of molecules wherein the unsaturation is provided in the polymer chain. Moreover, in the polymers of our invention, polycarboxylic reactants that are used to provide unsaturation in the polymer molecule, react in a monofunctional manner in the esterification reaction, leaving many unreacted acidic groups. It was unexpected that such highly acidic materials would be highly useful products having good water resistance and many other desirable properties. The free acid groups may be advantageously used for incorporating reactive additives directly into the polymer molecules.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Castings may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as Orlon, mineral fibers such as asbestos, natural fibers such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers and dyes.

Another novel property of the hydroxy alkylated novolak esters in their solubility in alkaline solutions such as ammonia or sodium hydroxide solutions. Even when the resins are in solution in styrene they may be dissolved and dispersed in ammonia-water solutions.

The foregoing detailed description and the following specific examples are for purposes of illustration only and are not intended as being limiting to the spirit or scope of the appended claims.

Example 1

This example illustrates the preparation of phenol novolak and hydroxy propylation.

Into a ten gallon glass lined pressure reactor is charged 33.33 pounds of phenol and seventy-five grams of oxalic acid. This is heated to one hundred degrees centigrade, and 17.8 pounds of thirty-seven percent formalin is pumped into the closed reactor. The pressure rose to ninety-five p.s.i. and the temperature to one hundred and forty-six degrees centigrade. The reaction was completed in fifteen minutes. Water and free phenol were removed by distillation and finished at one hundred and seventy-five degrees centigrade and twenty-nine inches vacuum. The yield was 28.5 pounds of novolak of about five hundred and twenty molecular weight.

The reactor was sealed and three hundred and fifty grams of fifty percent NaOH was added followed by 17.4 pounds of propylene oxide. The temperature was maintained at one hundred and fifty to one hundred and seventy degrees centrigrade, and held until the pressure dropped to zero p.s.i.g. Analysis of the product showed that <0.1 percent phenolic hydroxyl remained and the hydroxyl number was three hundred and thirty-four.

Example 2

This example illustrates the preparation of and hydroxy propylation of a styrenated phenol novolak.

Phenol (18.8 pounds), and concentrated sulfuric acid (9.8 grams) were charged into a ten gallon glass lined pressure reactor. Styrene (20.8 pounds) was added slowly. The temperature rose to about one hundred and twenty degrees centigrade and was held until the refractive index indicated that the reaction was completed. Sodium alkyl arylsulfonate was added, the reactor sealed and thirty-seven percent formalin (12.2 pounds) was pumped in. The temperature rose to one hundred and fifty degrees centigrade and the pressure to ninety-five pounds. After the pressure dropped to about fifty pounds the reactor was carefully vented and 0.88 pound of fifty percent sodium hydroxide added. The resin was dehydrated by distillation to a temperature of one hundred and seventy-five degrees centigrade and twenty-nine inches vacuum.

The reactor was again sealed and 13.92 pounds of propylene oxide was pumped into the reactor and the temperature maintained at one hundred and fifty-seven to one hundred and seventy degrees centigrade. After one hour the temperature had dropped to zero p.s.i.g. Analysis of the product showed 0.4 percent phenolic hydroxyl and a hydroxyl number of two hundred and two.

The foregoing example showed the preparation of a phenol-aldehyde resin using an alkylated phenol. Likewise, it is within the scope of the invention to add substituents to the phenol-aldehyde resins after their preparation, such as by alkylation of the phenolic nuclei with styrene.

Example 3

This example illustrates the preparation and hydroxy propylation of a dodecyl phenol novolak.

To 14.1 pounds of phenol in a stainless steel kettle is added 0.28 pound of boron trifluoride and 25.4 pounds of tetrapropylene and the temperature maintained at fifty to sixty degrees centigrade until the refractive index indicates completion of the reaction. The alkylated phenol is washed with hot water until free of acid. The crude dodecyl phenol is transferred to a ten gallon glass lined pressure reactor and 0.2 pound of oxalic acid is added. The reactor is heated to one hundred degrees centigrade and 9.72 pounds of thrity-seven percent formalin is added. After the reaction is completed the resin is dehydrated by distillation and reacted with 10.4 pounds of propylene oxide as described in Examples 1 and 2. The finished resin has a hydroxyl number of one hundred and sixty-four with 0.2 percent free phenolic hydroxyl.

Example 4

The novolaks used in this example are the same as those in Examples 1, 2 and 3, and derivatives were prepared using 13.20, 10.56 and 10.56 pounds respectively of ethylene oxide instead of propylene oxide. The reactions proceeded as noted in Examples 1, 2 and 3 with the corresponding hydroxyl ethyl derivatives being produced.

Example 5

This example illustrates the preparation and properties of resins, castings and laminates.

(a) A five liter flask was charged with 1730 grams of the hydroxy propylated resin of Example 1 and nine hundred and eighty grams of maleic anhydride and heated at one hundred to one hundred and ten degrees centigrade for fifteen minutes to one hour until an acid number of two hundred and eight was obtained. Styrene (1335) grams containing 0.6 gram of hydroquinone was added and mixed until in solution.

A casting was prepared from the above prepared composition by adding two percent of a paste containing fifty percent of benzoyl peroxide in tricresyl phosphate and curing sixteen hours at fifty degrees centigrade and twenty-four hours at one hundred and twenty degrees centigrade. The properties are:

| | |
|---|---|
| Barcol hardness | 46 |
| Heat distortion, °C. | 141 |
| Compressive strength, p.s.i. | 21,100 |
| Flexural strength, p.s.i. | 14,700 |
| Flexural modulus | $5.27 \times 10^5$ |

A laminate was prepared from twelve plies of one hundred and eighty-one cloth provided with a Volan A finish using the above prepared composition as a binder therefor. The laminate was cured ten minutes at eighty degrees centigrade and ten minutes at one hundred and twenty degrees centigrade at a pressure of twenty-five p.s.i.

The properties are:

| | |
|---|---|
| Barcol hardness | 69 |
| Flexural strength, p.s.i. | 69,900 |
| Flexural modulus, p.s.i. | $2.71 \times 10^6$ |
| Tensile strength, p.s.i. | 47,350 |
| Tensile modulus, p.s.i. | $2.69 \times 10^6$ |
| Compressive strentgh, p.s.i. | 52,460 |

(b) Thirteen hundred ninety grams of the hydroxy propylated resin of Example 2 was reacted with four hundred and ninety grams of maleic anhydride to an acid number of one hundred and forty-nine as described in part (a) above. To this was added 1240 grams of styrene and 0.47 gram of hydroquinone. A casting and laminate was prepared as described in part (a) above.
The properties are:

|  | Casting | Laminate |
|---|---|---|
| Barcol Hardness | 43 | 67 |
| Heat Distortion, °C | 106 | |
| Flexural Strength, p.s.i | 8430 | 69,000 |
| Flexural Modulus, p.s.i | $5.8 \times 10^6$ | $3.27 \times 10^6$ |
| Tensile Strength, p.s.i | 6130 | 13,000 |
| Tensile Modulus, p.s.i | $6.20 \times 10^6$ | $2.27 \times 10^6$ |
| Compressive Strength, p.s.i | 17,900 | 46,600 |

(c) Seventeen hundred ten grams of the hydroxy propylated resin of Example 2 was reacted with four hundred and ninety grams of maleic anhydride to an acid number of one hundred and twenty-eight as described in part (a) above. To this was added eleven hundred grams of styrene and 0.5 gram of hydroquinone. A casting and laminate was prepared as described in part (a) above.
The properties are:

|  | Casting | Laminate |
|---|---|---|
| Barcol Hardness | 27 | 55 |
| Heat Distortion, °C | 97 | |
| Flexural Strength, p.s.i | | 47,200 |
| Flexural Modulus, p.s.i | | $2.40 \times 10^6$ |
| Tensile Strength, p.s.i | | 46,470 |
| Tensile Modulus, p.s.i | | $2.17 \times 10^6$ |
| Compressive Strength, p.s.i | 12,480 | 31,000 |

*Example 6*

This example illustrates the use of an alkylene halohydrin in the invention.

Into a five liter, three-necked flask was charged five hundred and twenty grams of a novolak prepared as described in Example 1 and six hundred grams of ethyl-alcohol. To the mixture was added eight hundred and eighty grams of a thirty-three percent sodium hydroxide solution. The solution was heated to eighty degrees centigrade and four hundred and forty-three grams of ethylene chlorohydrin was added over a period of one hour. The reaction was refluxed until free of phenolic hydroxyl, the alcohol was distilled off and the resin was washed with hot water until free of salt. The residue was dried by heating to one hundred and fifty degrees centigrade under vacuum.

The resin was reacted with maleic anhydride and cross-linked with styrene as described in Example 5.

The following examples illustrate the use of alkylene carbonates in the invention.

*Example 7*

Three hundred twelve grams of the novolak prepared in Example 1, two hundred and sixty-seven grams ethylene carbonate and 1.5 grams of potassium carbonate were mixed together and heated to one hundred and seventy to one hundred and eighty degrees centigrade under a stream of $N_2$. Carbon dioxide was evolved. After six hours, the resin was free of phenolic hydroxyl and had a hydroxyl number of three hundred and fifty-seven.

*Example 8*

Three hundred twelve grams of the novolak prepared in Example 1, two hundred and ninety grams propylene carbonate and 1.5 grams of potassium carbonate were mixed together and heated to one hundred and seventy to one hundred and eighty degrees centigrade under a stream of $N_2$ for twelve hours. Carbon dioxide was evolved. The resin was free of phenolic hydroxyl and had a hydroxyl number of three hundred and thirty-eight.

The resins of Examples 7 and 8 were reacted with maleic anhydride and cross-linked with styrene as described in Example 5.

The following examples illustrate the preparation of the ester derivatives using acids and acid halides.

*Example 9*

Three moles of fumaryl chloride was charged into a reaction vessel equipped with a reflux condenser and heated to one hundred and twenty degrees centigrade. To the vessel was added one hundred and sixty-two parts of the hydroxy-propylated resin described in Example 1, in two hundred parts of dioxane. The evolved hydrogen chloride was swept out of the flask with a stream of nitrogen and collected in a water trap. After one mole of hydrogen chloride was collected, the reflux condenser was removed and the dioxane and excess fumaryl chloride were removed by vacuum distillation. The remaining acid chloride group was hydrolyzed with water and the evolved hydrogen chloride was collected.

The resulting resin was dissolved in thirty parts of styrene per hundred of resin and stabilized with 0.015 percent of toluhydroquinone. Castings and glass cloth laminates were made from the resulting resin.

*Example 10*

Three moles of itaconic acid was introduced to a reaction vessel equipped with a reflux condenser and heated to one hundred and twenty degrees centigrade. One hundred and sixty-two parts of the hydroxypropylated resin described in Example 1 was dissolved in two hundred parts of xylene and slowly added to the vessel. Heating was continued until one mole of water was evolved. The reaction mixture was washed with a large excess of nearly boiling water, after which the xylene and water were removed from the resin by distillation.

The resulting resin was dissolved in thirty parts of styrene per hundred of resin and stabilized with 0.015 percent of toluhydroquinone. The resin was suitable for use in preparing castings and laminates.

The following example illustrates the preparation of a thermoset polymer of the invention without the aid of an unsaturated monomer.

*Example 11*

To one hundred parts of the maleate of Example 5(a) was added one part of tertiary butyl perbenzoate. The mixture was heated at one hundred and twenty degrees centigrade for three hours. The reaction product was a hard, solid, infusible and insoluble resin.

In the foregoing specification, the acid chlorides have been indicated to be the preferred acid halides for use in the esterification reaction. However, the acid bromides and acid iodides corresponding to the acid chlorides disclosed herein are also suitable, but are more costly to use.

When the ethylenically unsaturated thermoplastic polymers are cross-linked with an ethylenically unsaturated monomer, the ratio of monomer to polymer can be varied widely depending on the particular reactants, desired polymer properties and the like, but will generally range from fifteen to one hundred and fifty parts by weight of monomer per one hundred parts of thermoplastic polymer.

We claim:

1. A process for preparing a thermoset polymer comprising the steps of admixing a catalytic amount of a free radical polymerization catalyst with a thermoplastic polymer, the thermoplastic polymer being prepared by a process comprising the steps of reacting together to produce a hydroxy-ether derivative (1) a fusible, organic solvent soluble condensation product of a phenol and an aldehyde containing condensate units having reactive phenolic hydroxyl groups, and (2) a substance reactive with the phenolic hydroxyl groups selected from the group consisting of mono oxirane ring compounds, alkylene halohydrins, alkylene carbonates, and mixtures thereof, and esterifying the hydroxyether derivative by reacting it together with a carboxylic substance selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and catalyst to produce a thermoset polymer.

2. A process for preparing a thermoset polymer comprising the steps of admixing a catalytic amount of a free radical polymerization catalyst with a thermoplastic polymer, the thermoplastic polymer being prepared by a process comprising the steps of reacting together to produce a hydroxyether derivative a novolak containing condensate units having reactive phenolic hydroxyl groups and an alkylene oxide, and esterifying the hydroxyether derivative by reacting it together with maleic anhydride to produce a thermoplastic ester derivative, the thermoplastic polymer admixed with the catalyst containing substantially no free reactive phenolic hydroxyl groups, and polymerizing the admixture of thermoplastic polymer and catalyst to produce a thermoset polymer.

3. A process for preparing a thermostat polymer comprising the steps of admixing an ethylenically unsaturated thermoplastic polymer with an ethylenically unsaturated monomer copolymerizable therewith in an amount to produce a thermoset polymer, the thermoplastic polymer being prepared by a process comprising the steps of reacting together to produce a hydroxyether derivative (1) a fusible, organic solvent soluble condensation product of a phenol and an aldehyde containing condensate units having reactive phenolic hydroxyl groups, and (2) a substance reactive with the phenolic hydroxyl groups selected from the group consisting of mono oxirane ring compounds, alkylene halohydrins, alkylene carbonates, and mixtures thereof, and esterifying the hydroxyether derivative by reacting it together with a carboxylic substance selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and monomer in the presence of a free radical catalyst to produce a thermoset polymer.

4. A process for preparing a thermoset polymer comprising the steps of admixing an ethylenically unsaturated thermoplastic polymer with an ethylenically unsaturated monomer copolymerizable therewith in an amount to produce a thermoset polymer, the thermoplastic polymer being prepared by a process comprising the steps of reacting together to produce a hydroxyether derivative, a novolak containing condensate units having reactive phenolic hydroxyl groups and an alkylene oxide, and esterifying the hydroxyether derivative by reacting it together with maleic anhydride to produce a thermoplastic ester derivative, the thermoplastic polymer admixed with the ethylenically unsaturated monomer containing substantially no free reactive phenolic hydroxyl groups, and polymerizing the admixture of thermoplastic polymer and monomer in the presence of a free radical catalyst to produce a thermoset polymer.

5. A thermoset polymer prepared by a process comprising admixing a catalytic amount of a free radical polymerization catalyst with a thermoplastic polymer, the thermoplastic polymer being prepared by a process comprising the steps of reacting together to produce a hydroxyether derivative (1) a fusible, organic solvent soluble condensation product of a phenol and an aldehyde containing condensate units having reactive phenolic hydroxyl groups, and (2) a substance reactive with the phenolic hydroxyl groups selected from the group consisting of mono oxirane ring compounds, alkylene halohydrins, alkylene carbonates, and mixtures thereof, and esterifying the hydroxyether derivative by reacting it together with a carboxylic substance selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and catalyst to produce a thermoset polymer.

6. An article comprising the thermoset polymer of claim 5.

7. A reinforced plastic article comprising the thermoset polymer of claim 5 and a reinforcing medium therefor.

8. A laminated article comprising a plurality of layers of reinforcing medium and as a binder therefor the thermoset polymer of claim 5.

9. A molded article comprising the thermoset polymer of claim 5.

10. A thermoset polymer prepared by a process comprising admixing a catalytic amount of a free radical polymerization catalyst with a thermoplastic polymer, the thermoplastic polymer being prepared by a process comprising the steps of reacting together to produce a hydroxyether derivative, a novolak containing condensate units having reactive phenolic hydroxyl groups and an alkylene oxide, and esterifying the hydroxyether derivative by reacting it together with maleic anhydride to produce a thermoplastic ester derivative, the thermoplastic polymer admixed with the catalyst containing substantially no free reactive phenolic hydroxyl groups, and polymerizing the admixture of thermoplastic polymer and catalyst to produce a thermoset polymer.

11. A thermoset polymer prepared by a process comprising admixing an ethylenically unsaturated thermoplastic polymer with an ethylenically unsaturated monomer copolymerizable therewith in an amount to produce a thermoset polymer, the thermoplastic polymer being prepared by a process comprising the steps of reacting together to produce a hydroxyether derivative (1) a fusible, organic solvent soluble condensation product of a phenol and an aldehyde containing condensate units having reactive phenolic hydroxyl groups, and (2) a substance reactive with the phenolic hydroxyl groups selected from the group consisting of mono oxirane ring compounds, alkylene halohydrins, alkylene carbonates, and mixtures thereof, and esterifying the hydroxyether derivative by reacting it together with a carboxylic substance selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and mono-

13 mer in the presence of a free radical catalyst to produce a thermoset polymer.

12. An article comprising the thermoset polymer of claim 11.

13. A reinforced plastic article comprising the thermoset polymer of claim 11 and a reinforcing medium therefor.

14. A laminated article comprising a plurality of layers of reinforcing medium and as a binder therefor the thermoset polymer of claim 11.

15. A molded article comprising the thermoset polymer of claim 11.

16. A thermoset polymer prepared by a process comprising admixing an ethylenically unsaturated thermoplastic polymer with an ethylenically unsaturated monomer copolymerizable therewith in an amount to produce a thermoset polymer, the thermoplastic polymer being prepared by a process comprising the steps of reacting together to produce a hydroxyether derivative a novolak containing condensate units having reactive phenolic hydroxyl groups and an alkylene oxide, and esterifying the hydroxyether derivative by reacting it together with maleic anhydride to produce a thermoplastic ester derivative, the thermoplastic polymer admixed with the ethylenically unsaturated monomer containing substantially no free reactive phenolic hydroxyl groups, and polymerizing the admixture of thermoplastic polymer and monomer in the presence of a free radical catalyst to produce a thermoset polymer.

17. A polymerizable composition of matter comprising an ethylenically unsaturated thermoplastic polymer and an ethylenically unsaturated monomer copolymerizable therewith, said thermoplastic polymer being prepared by a process comprising the steps of reacting together to produce a hydroxyether derivative (1) a fusible, organic solvent soluble condensation product of a phenol and an aldehyde containing condensate units having reactive phenolic hydroxyl groups, and (2) a compound reactive with the phenolic hydroxyl groups selected from the group consisting of mono oxirane ring compounds, alkylene halohydrins, alkylene carbonates, and mixtures thereof, and esterifying the hydroxyether derivatives by reacting it together with a carboxylic compound selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic compounds reacted with the said condensation products being ethylenically unsaturated and the condensate units of the resultant condensation product containing at least one isolated addition polymerizable carbon-carbon double bond.

18. A polymerizable composition of matter comprising an ethylenically unsaturated thermoplastic polymer dissolved in styrene monomer, the thermoplastic polymer being prepared by a process comprising the steps of reacting together to produce a hydroxyether derivative (1) a fusible, organic solvent soluble condensation product of a phenol and formaldehyde containing condensate units having reactive phenolic hydroxyl groups selected from the group consisting of mono oxirane ring compounds, alkylene halohydrins, alkylene carbonates, and mixtures thereof, and esterifying the hydroxyether derivative by reacting it together with a carboxylic substance selected from the group consisting of carboxylic acids, carboxylic acid anhydrides, carboxylic acid halides and mixtures thereof a portion of said carboxylic compound being polycarboxylic to produce a thermoplastic ester derivative, at least one of the carboxylic substances reacted with the condensation product being ethylenically unsaturated and the condensate units of the resultant condensation product containing at least one isolated addition-polymerizable carbon-carbon double bond, the thermoplastic polymer dissolved in the styrene containing substantially no free reactive phenolic hydroxyl groups.

14

19. A polymerizable composition of matter comprising an ethylenically unsaturated thermoplastic polymer dissolved in styrene monomer, the thermoplastic polymer being prepared by a process comprising the steps of reacting together to produce a hydroxyether derivative a novolak containing condensate units having reactive phenolic hydroxyl groups and an alkylene oxide, and esterifying the hydroxyether derivative by reacting it together with maleic anhydride to produce a thermoplastic ester derivative, the thermoplastic polymer dissolved in the styrene containing substantially no free reactive phenolic hydroxyl groups.

20. A process for preparing a thermoset polymer comprising the steps of admixing a catalytic amount of a free radical polymerization catalyst with a thermoplastic polymer, the thermoplastic polymer being prepared by a process comprising the steps of reacting together at a temperature less than 250 degrees centigrade to produce a hydroxyether derivative (1) a fusible, organic solvent soluble condensation product of a phenol and an aldehyde containing condensate units having reactive phenolic hydroxyl groups, and (2) a substance reactive with the phenolic hydroxyl groups selected from the group consisting of mono oxirane ring compounds, alkylene halohydrins, alkylene carbonates, and mixtures thereof, and esterifying the hydroxyether derivative by reacting it at a temperature less than 150 degrees centigrade together with a carboxylic substance selected from the group consisting of dicarboxylic acids, dicarboxylic acid anhydrides, dicarboxylic acid halides and mixtures thereof to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and catalyst to produce a thermoset polymer.

21. A thermoset polymer prepared by a process comprising admixing a catalytic amount of a free radical polymerization catalyst with a thermoplastic polymer, the thermoplastic polymer being prepared by a process comprising the steps of reacting together to produce a hydroxyether derivative (1) a fusible, organic solvent soluble condensation product of a phenol and an aldehyde containing condensate units having reactive phenolic hydroxyl groups, and (2) from one to about three moles of a substance reactive with the phenolic hydroxyl groups per mole of phenolic hydroxyl, said substance selected from the group consisting of mono oxirane ring compounds, alkylene halohydrins, alkylene carbonates, and mixtures thereof, and esterifying the hydroxyether derivative by reacting it together with about one half to about one mole per hydroxyl equivalent of said hydroxyether derivative, of a carboxylic substance selected from the group consisting of dicarboxylic acids, dicarboxylic acid anhydrides, dicarboxylic acid halides and mixtures thereof to produce a thermoplastic ester derivative, at least one of the carboxylic substances reacted with the condensation product being ethylenically unsaturated and the condensate units of the resultant condensation product containing at least one isolated addition-polymerizable carbon-carbon double bond; and polymerizing the admixture of thermoplastic polymer and catalyst to produce a thermoset polymer.

References Cited by the Examiner

UNITED STATES PATENTS

| 2,129,685 | 9/1938 | Graves | 260—479 |
| 2,581,390 | 1/1952 | De Groote et al. | 260—52 |
| 2,626,929 | 1/1953 | De Groote | 260—485 |
| 2,695,894 | 11/1954 | D'Alelio | 260—59 |
| 2,891,989 | 6/1959 | Petras | 260—485 |
| 2,897,180 | 7/1959 | Partansky et al. | 260—19 |
| 2,934,522 | 4/1960 | Partansky et al. | 260—59 |

(Other references on following page)

UNITED STATES PATENTS 2,991,269 7/1961 Nozaki _____ 260—875
3,037,948 6/1962 Landler et al. _____ 260—876

OTHER REFERENCES

Carswell, T. S., Phenoplasts, Interscience, New York, 1947 (p. 31 relied on).

Martin, The Chemistry of Phenolic Resins, John Wiley and Sons, New York, 1956 (p. 56 relied on).

SAMUEL H. BLECH, *Primary Examiner.*

LEON J. BERCOVITZ, MURRAY TILLMAN,
*Examiners.*